United States Patent [19]

Palmer

[11] Patent Number: 5,680,274
[45] Date of Patent: Oct. 21, 1997

[54] INTEGRATED SUSPENSION FOR AN INFORMATION STORAGE SYSTEM HAVING ELECTROSTATIC DISCHARGE PROTECTION

[75] Inventor: Darrell Dean Palmer, San Jose, Calif.

[73] Assignee: International Business Machines Corporation, Armonk, N.Y.

[21] Appl. No.: 560,176

[22] Filed: Nov. 17, 1995

Related U.S. Application Data

[63] Continuation of Ser. No. 266,287, Jun. 27, 1994, abandoned.
[51] Int. Cl.$^6$ .............................. G11B 5/48; G11B 21/16
[52] U.S. Cl. ............................................................ 360/104
[58] Field of Search ................................. 360/103, 104, 360/106

[56] References Cited

U.S. PATENT DOCUMENTS

| | | | |
|---|---|---|---|
| 4,761,699 | 8/1988 | Ainslie et al. | 360/103 |
| 4,792,875 | 12/1988 | Ohdaira | 360/104 |
| 4,819,094 | 4/1989 | Oberg | 360/104 |
| 4,996,623 | 2/1991 | Erpelding et al. | 360/104 |
| 5,166,846 | 11/1992 | Shigemoto | 360/104 |
| 5,245,489 | 9/1993 | Kimura et al. | 360/104 |
| 5,343,344 | 8/1994 | Nagase | 360/104 |
| 5,391,842 | 2/1995 | Bennin et al. | 360/104 |

FOREIGN PATENT DOCUMENTS

| | | | |
|---|---|---|---|
| 166314 | 6/1989 | Japan | 360/104 |
| 2193833A | 2/1988 | United Kingdom . | |

OTHER PUBLICATIONS

IBM Technical Disclosure Bulletin, "Magnetic Head Arm Assebly", vol. 23, No. 12, May 1981, 5556–5557.

S. Puttanaik, *Method for Slider Attachment and Head Termination to a Suspension in a Disk File*, IBM Technical Disclosure Bulletin, vol. 36, No. 02, Feb. 1993.

J. R. Reidenbach, *Combination Suspension–Lead Cable For A Multi–Gap Read/Write Head*, IBM Technical Disclosure Bulletin, vol. 22, No. 4, Sep. 1979.

*Primary Examiner*—Stuart S. Levy
*Assistant Examiner*—George J. Letscher
*Attorney, Agent, or Firm*—Noreen A. Krall; Andrew J. Dillon

[57] ABSTRACT

An integrated suspension for a disk drive having electrostatic discharge protection using either physical barriers or suspension structures which substantially reduces or eliminates the possibility of electrostatic discharge to the suspension conductive lines through physical contact with another charged object. The various embodiments of this invention include a suspension structure having a flange member extending from its surface, a suspension structure wherein the electrical lead lines are recessed in a channel, a suspension where the electrical lead lines are covered by an enclosing metal member, and a suspension where the electrical lead lines are covered by a conformal insulating layer.

5 Claims, 5 Drawing Sheets

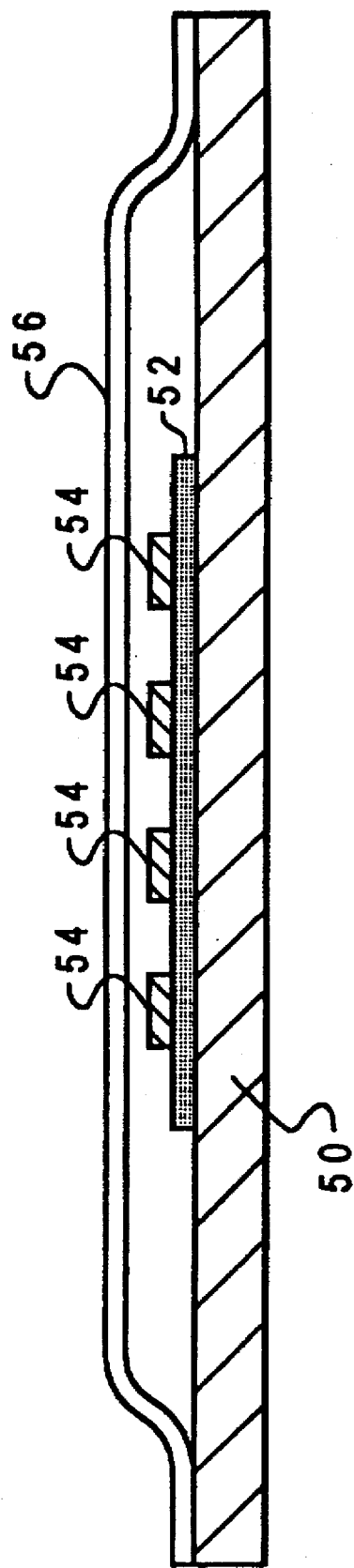
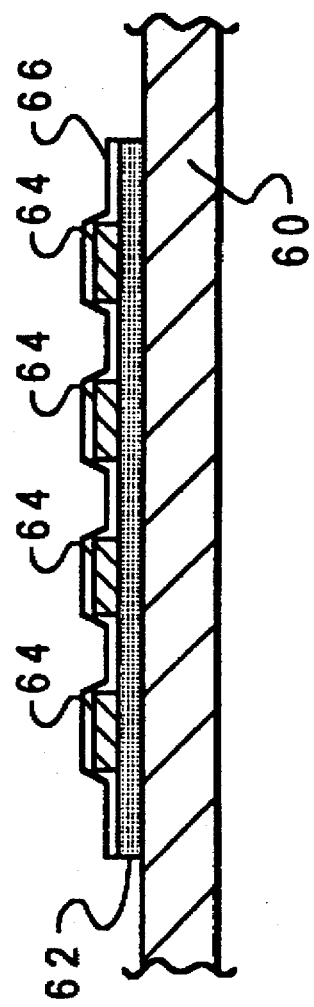

5,680,274

INTEGRATED SUSPENSION FOR AN INFORMATION STORAGE SYSTEM HAVING ELECTROSTATIC DISCHARGE PROTECTION

This is a continuation of application Ser. No. 08/266,287 filed Jun. 27, 1994, now abandoned.

BACKGROUND OF THE INVENTION

1. Technical Field

This invention relates to electrostatic discharge protection of conductor lines integrally formed on a disk drive slider suspension.

2. Description of the Related Art

Information storage devices, which include magnetic storage devices and optical data storage systems, utilize at least one rotatable disk with concentric data tracks containing the information, a transducer for reading data from or writing data to the various tracks, and a head positioning actuator connected to a head containing the transducer for moving it to the desired track and maintaining it over the track centerline during read or write operations. The transducer is attached to a head (or "slider") having an air bearing surface which is supported adjacent the data surface of the disk by a cushion of air generated by the rotating disk. The slider is attached on its back side (the side opposite the air bearing surface) to the suspension, and the suspension is attached to an actuator arm of the head positioning actuator.

The suspension provides dimensional stability between the slider and actuator arm, controlled flexibility in pitch and roll motion of the slider relative to its direction of motion on the rotating disk, and resistance to yaw (radial) motion. The suspension typically provides a load or force against the slider which is compensated by the force of the air bearing between the slider's air bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air bearing surface and the rotating disk. Such a suspension is described in U.S. Pat. No. 4,167,765, which is assigned to the same assignee as this application. An example of a conventional slider is described in U.S. Pat. No. 3,823,416, which is assigned to the same assignee as this application.

In the conventional slider-suspension assemblies, the slider is mechanically attached to the flexure of the suspension by epoxy bonding. The electrical connection between the transducer and the disk drive read/write electronics is made by twisted wires which run the length of the suspension load beam and extend over the flexure and slider. The ends of the wires are ultrasonically bonded to the transducer leads on the slider. The fabrication of such a slider-suspension requires manual assembly and is, thus, time consuming and costly.

Another type of suspension is a composite or laminated structure comprising a base layer, a patterned conductive layer with patterned electrical leads formed thereon, and an insulating layer in between, as described in IBM Technical Disclosure Bulletin, Vol. 22, No. 4 (September, 1979), pp. 1602-1603. In this laminated suspension, the slider is epoxy bonded to the laminated suspension and the transducer leads are soldered to the electrical leads formed on the suspension.

Another laminated structure type of suspension is comprised of a base layer of stainless-steel, an insulating layer of polyimide formed on the base layer, and a patterned conductive layer of etched copper alloy formed on the insulating layer, as described in U.S. Pat. No. 4,996,623. The etched copper layer provides a lead structure electrically connecting the thin-film magnetic head transducer and the disk drive's read/write electronics. A method for attaching a slider to a laminated/etched suspension in a data recording disk file has been described in U.S. Pat. No. 4,761,699 and IBM Technical Disclosure Bulletin, Vol. 36, No. 2, February, 1993, p. 371.

Damage to read/write elements contained in the slider which is caused by electrostatic discharge (ESD) is a significant problem in manufacturing disk drives. This problem is particularly pronounced in high performance MR heads that are connected by twisted pair cables. Multilayered laminated suspensions with integrated etched read/write cables offer some ESD protection advantages over twisted pair cables because it is generally easier to short (or shunt) the wires during assembly to prevent current flow through the MR element, which might be induced by electrostatic charge. However, one disadvantage associated with the laminated suspensions currently used in the industry is that the etched conductors located on the surface of the suspension are not insulated. If the bare conductors come in contact with a highly tribo-charged surface, it may be possible under some conditions to "zap" the head with the proper voltage and frequency to cause damage to the read/write elements of the head, even if the conductive lines are shunted. Therefore, it would be desirable to provide ESD protection to laminated suspension head-gimbal assemblies which reduces the probability of accidental wire contacts with electrostatically charged objects.

SUMMARY OF THE INVENTION

According to the present invention, a suspension is provided suitable for use as a slider-suspension assembly for an information storage system and having electrostatic discharge protection. The suspension comprises a base member having conductive lines integrally formed thereon, and means for protecting the conductive lines from contact with an object that contains static charge. One embodiment comprises a flange, formed by an end of the base member, extending out from the base member on the same side as and near the conductive lines. Another embodiment comprises a channel formed in the base member by bending both ends of the base member, and further wherein the conductive lines are formed within the channel. Another embodiment comprises a conformal layer of an insulating material formed over the conductive lines formed on the base member. Still another embodiment comprises an enclosing member attached to the base member placed over and out of contact with the conductive lines. The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 depicts a cross-sectional view of a suspension having an enclosing member according to a preferred embodiment of the present invention.

FIG. 8 depicts a cross-sectional view of a suspension having a conformal insulating layer according to a preferred embodiment of the present invention.

DETAILED DESCRIPTION OF PREFERRED EMBODIMENT

Figure 1:
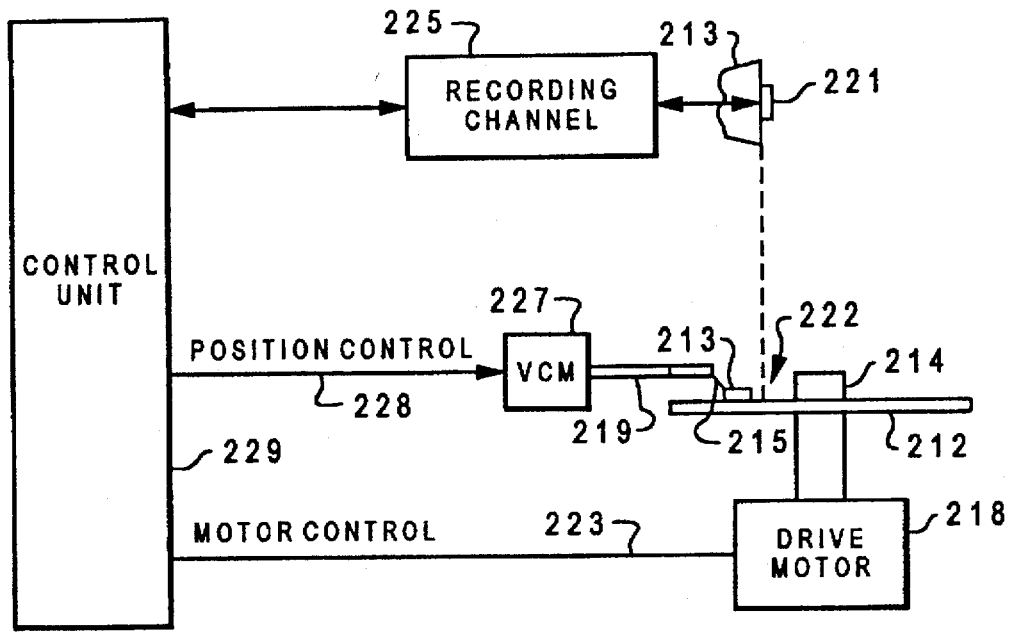
FIG. 1 depicts a magnetic disk storage system.

Although the present invention is described as embodied in a magnetic disk storage system as shown in FIG. 1, it will be apparent that the invention is also applicable to other information storage systems such as an optical data storage system or a magnetic tape recording system, for example. At least one rotatable magnetic disk 212 is supported on a spindle 214 and rotated by a disk drive motor 218. The magnetic recording media on each disk is in the form of an annular pattern of concentric data tracks (not shown) on disk 212.

At least one slider 213 is positioned on the disk 212, each slider 213 is supporting one or more magnetic read/write heads 221. As the disks rotate, the sliders 213 are moved radially in and out so that the heads 221 may access different portions of the disk surface 222 containing the data. Each slider 213 is attached to an actuator arm 219 by means of a suspension 215. The suspension 215 provides a slight spring force which biases the slider 213 against the disk surface 222. Each actuator arm 219 is attached to an actuator means 227. The actuator means shown in FIG. 1 is a voice coil motor (VCM), but it may also be a stepper motor. The VCM is a coil moveable within a fixed magnetic field, and the direction and velocity of the coil movements is controlled by the current supplied.

During operation of the disk storage system, the rotation of the disk 212 generates an air bearing between the slider 213 and the disk surface 222. The air bearing thus counterbalances the slight spring force of the suspension 215 and supports the slider 213 off the disk surface by a small, substantially constant spacing during operation. Although an air bearing is described with the preferred embodiment, any fluid bearing may be used including an oil lubricant.

The various components of the disk storage system are controlled in operation by signals generated by control (read/write electronics) unit 229, such as access control signals and internal clock signals, and which includes logic control circuits, storage means and a microprocessor. The control unit 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219.

Figure 2:
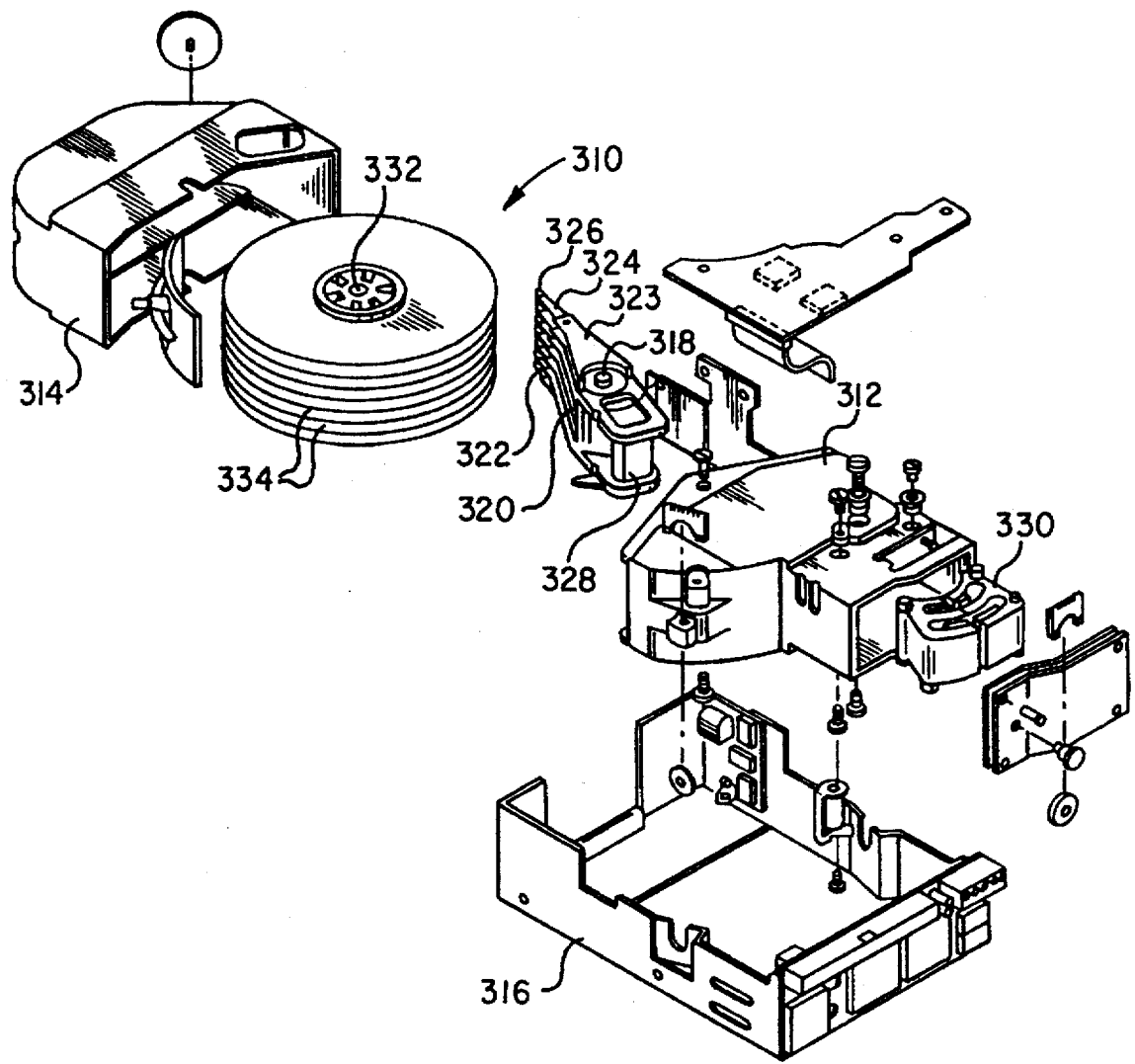
FIG. 2 depicts an exploded view of a disk drive.

The above description of a typical magnetic disk storage system, and the accompanying illustration of it in FIG. 1 are for representation purposes only. The invention described in this application is useful with all mechanical configurations of magnetic storage system disk drives or direct access storage devices ("DASD"). It should be apparent that disk storage systems may contain a large number of disks and actuators, and each actuator may support a number of sliders. For example, FIG. 2 is an exploded view of a disk drive 310. It should be noted that although a rotary actuator is shown herein the invention described is also applicable to linear actuators. The disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 includes an E block or comb like structure 322 having a plurality of actuator arms 323. Attached to the separate arms 323 on the comb or E block 322 are spring suspensions 324. Attached at the end of each spring suspension is a slider 326 which carries a magnetic transducer (not shown in FIG. 2). On the other end of the actuator arm assembly 320 opposite the spring suspensions 324 and the sliders 326 is a voice coil 328.

Attached within the housing 312 is a pair of magnets 330. The pair of magnets 330 and the voice coil 328 are key parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 2 eight disks are attached to the spindle shaft 332. The disks 334 are attached to the spindle shaft 332 in spaced apart relation.

Figure 3:
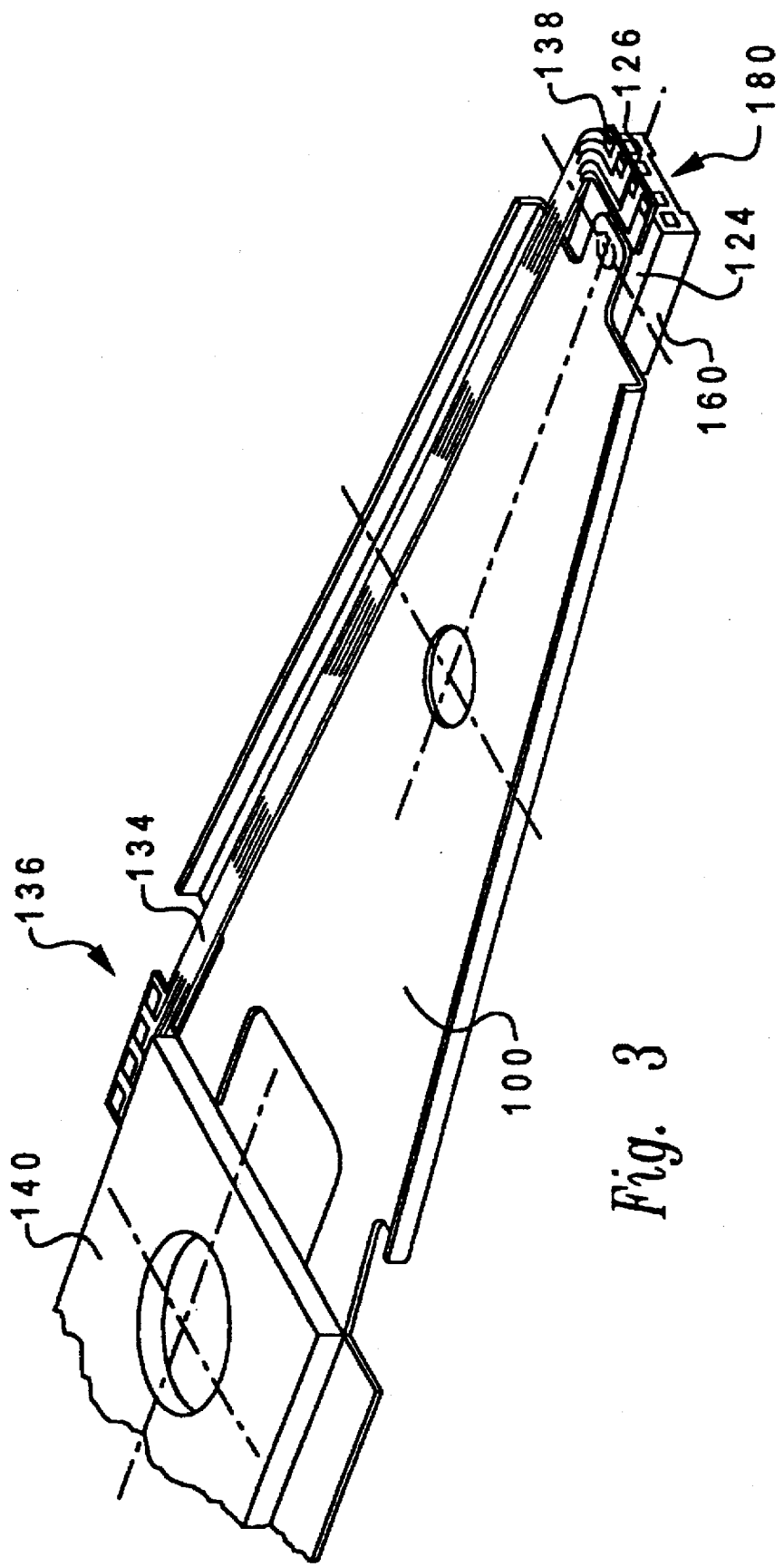
FIG. 3 shows a slider-suspension assembly according to a preferred embodiment of the present invention.

The present invention is an information storage system with an improved slider-suspension assembly as seen in FIG. 3. The suspension comprises a load beam 100. The suspension is attached to the disk file actuator arm (not shown) by means of a mounting plate 140. The slider 160 is a conventional slider formed of ceramic material, such as a mixture of alumina ($Al_2O_3$) and titanium carbide (TiC). The slider 160 has an air bearing surface 180, a back side 124 opposite and generally parallel to air bearing surface 180, and a trailing edge 126, which forms an end face oriented generally perpendicular to air bearing surface 180 and back side 124. Slider 160 is secured to load beam 100 by an epoxy bond with back side 124.

Located on the trailing edge 126 of slider 160 are two thin-film read/write transducers. Typically, multiple thin-film transducers are formed on a single slider, even though only one transducer is active as a read/write element, in order to improve the yield of the slider during the thin-film fabrication process. The transducers have pole tips which extend toward the edge of the air bearing surface 180.

As shown in FIG. 3, the electrical attachment to the read/write electronics is made by conductive lines 134, which are connected with the read/write electronics of the magnetic storage system at connection pads 136, and are connected by bond wires from connection pads 138 to the conductive leads of the transducer formed on slider 160.

Figure 4:
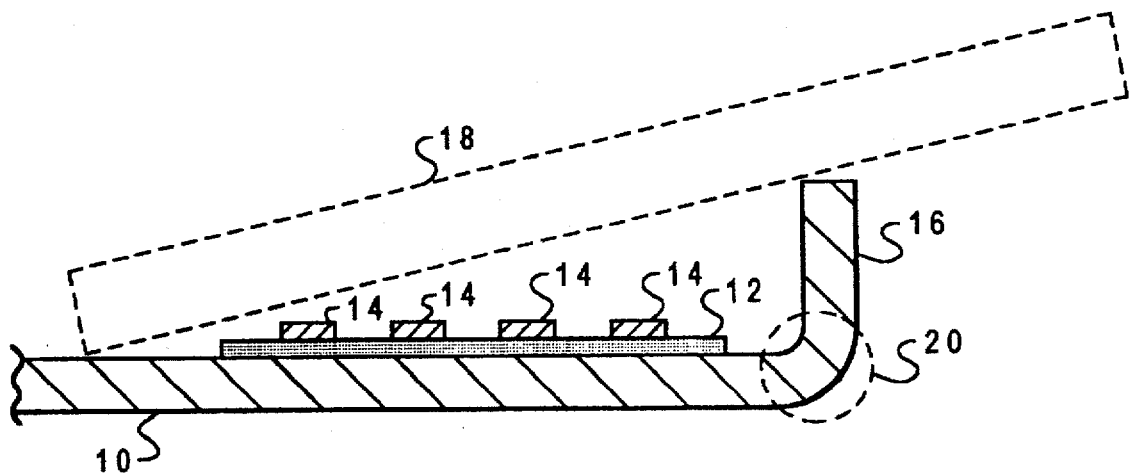
FIG. 4 depicts a cross-sectional view of a suspension having a flange according to a preferred embodiment of the present invention.

Referring now to FIG. 4, there is depicted a cross-sectional view of a suspension according to a preferred embodiment of the present invention. Base member 10

(equivalent to load beam 100 in FIG. 1) acts as a load beam to provide the suspension the structural integrity required to project the attached slider out over the disk. Base member 10 is preferably composed of stainless steel. Insulating layer 12 is formed between base member 10 and conductive lines 14, and is preferably a layer of polyimide. Conductive lines 14 are preferably copper strips. The suspension is produced by laminating three sheets of material and then forming the base member 10, insulating layer 12, and conductive lines 14 using etching techniques in conjunction with photolithographic technology.

As seen in FIG. 4, a flange 16 extends out from the base member 10 on the same side that conductive lines 14 have been formed. Moreover, the flange 16 is located near conductive lines 14. If the suspension encounters a tribo-charged object with a substantially flat surface, flange 16 encounters the object before conductive lines 14 are contacted. This prevents electrostatic charge from being transferred from the object to conductive lines 14, and in turn, "zapping" the magnetic transducer connected to conductive lines 14. For example, as the suspension encounters object 18, shown in dashed lines in FIG. 4, flange 16 obstructs object 18's descent on conductive lines 14 and maintains it in an elevated position above conductive lines 14. In this way, flange 16 prevents electrostatic charge from being transferred from an object contacting the suspension to the conductive lines that travel along the suspension carrying the slider head signals.

Flange 16 is created by bending an end, as seen from the cross section, of base member 10. The edge of the suspension running parallel to conductive lines 14 is bent up toward the conductive lines along the length of the suspension. The end of base member 10 is bent in a bend region 20 which is located near conductive lines 14. As is apparent from the depiction of object 18 in FIG. 4, the closer bend region 20 is to conductive lines 14, and the higher flange 16 extends out from base member 10, the greater will be the protection against contact with conductive lines 14. It will be appreciated that although flange 16 is produced by bending an end of base member 10, it may also be produced by extending a second member out from the surface of base member 10.

An alternative preferred embodiment of the present invention is produced by extending a second flange out from the base member 10 at the opposite end of base member 10 from flange 16. This flange extends out on the same side as and near the conductive lines 14. This second flange may also be produced by bending this opposite end of base member 10 in the same direction as flange 16. This embodiment creates a "channel" as a means for protecting the conductive lines from contact with an object that contains static charge. As can be seen from FIG. 5, flange 16 and flange 32 prevent object 18 from contacting conductive lines 14. Thus, the present invention protects conductive lines 14 by forming them within a channel defined by base member 30 and flanges 16 and 32. This embodiment is a particularly effective ESD protection when object 18 has a substantially flat surface in contact with the suspension and is of a length greater than the channel width defined by the distance between flange 16 and flange 32.

Figure 5:
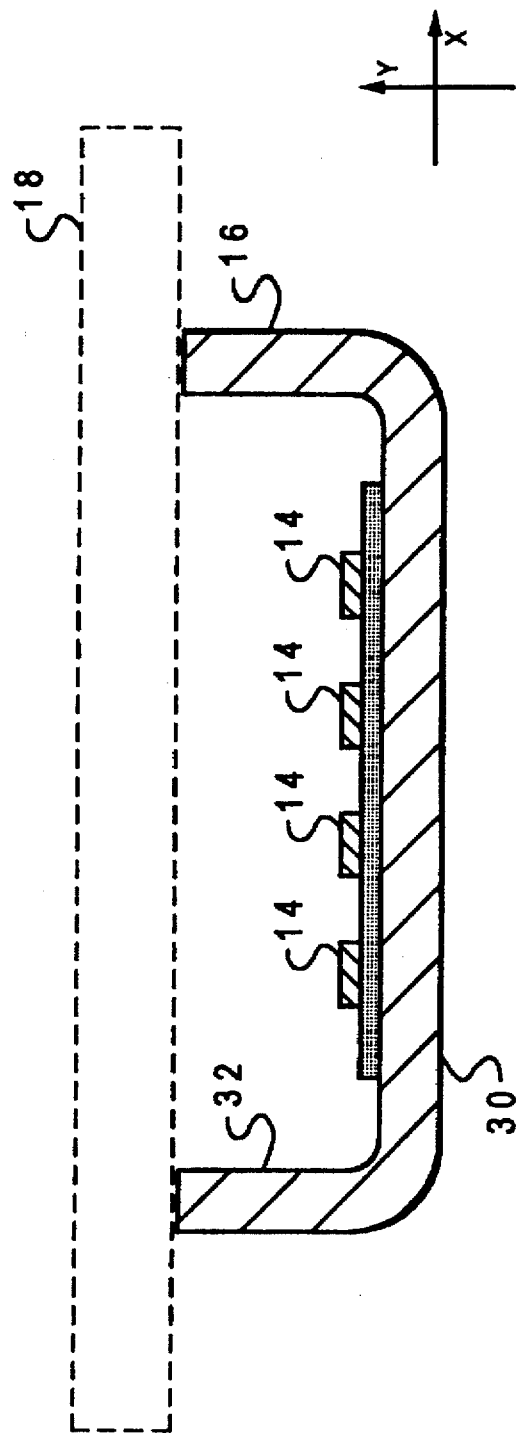
FIG. 5 depicts a cross-sectional view of a suspension having a channel according to a preferred embodiment of the present invention.

Flanges 16, 32 provide the additional advantages of stiffening the suspension and preventing bowing of the thin laminated structure. The addition of the flanges increases the section modulus of the beam making it much stiffer. This stiffening of the member 30 reduces beam deformation in the Y axis as shown in FIG. 5. Moreover, the flanges running along the length of this suspension increases the resonant frequency characteristic of the suspension.

Figure 6:
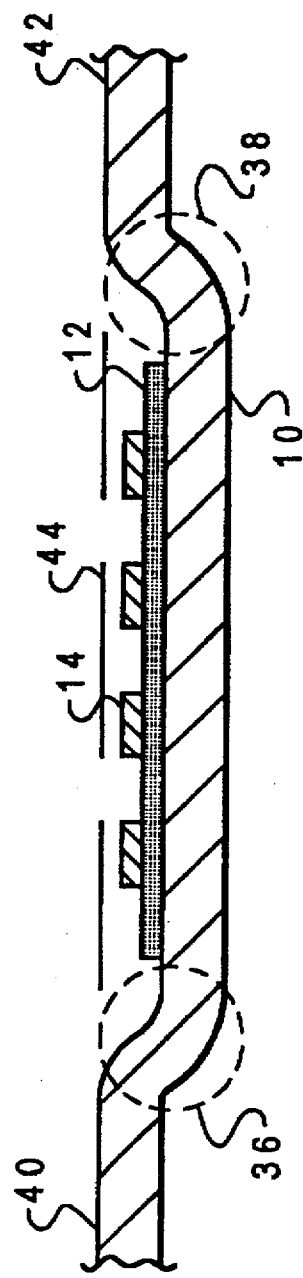
FIG. 6 depicts a cross-sectional view of a suspension having a channel according to a preferred embodiment of the present invention.

An alternative preferred embodiment which uses a channel type means for ESD protection is shown in FIG. 6. Here, conductive lines 14 are formed over insulating layer 12 and are inset into the channel defined by the two bend regions 36, 38 of base member 10. These two bend regions, designated by dashed circles 36 and 38, are comprised of a first bend of the base member in the direction of the conductive lines and a second bend in each of the bend regions in a direction away from the conductive lines. Since conductive lines 14 are located on the top surface of base member 10, the first bend rotates each side of the base member upward. The base member then has a second bend in each of the bend regions in a direction away from the conductive lines. This places the ends 40 and 42 of the base member 10 in a plane parallel with but elevated above the plane containing the conductor lines 14. This embodiment provides a channel in which the conductive lines 14 are formed. Thus, if a substantially flat object of a length greater than the width of the channel defined by the bend regions 36 and 38 encounters the suspension, it will encounter end regions 40 and 42 and will not pass beyond the plane defined by dashed line 44 to contact conductive lines 14.

An alternative method of creating a channel for ESD protection of the conductive lines would be to create a recess in base member 10 and form insulating layer 12 and conductive lines 14 within the recess. For example, this may be accomplished by etching a channel along the length of a stainless steel base member. Then an insulating layer of polyimide and a conductive layer of copper would be formed within the channel. Last, the conductive lines would be etched in the top copper layer.

Referring now to FIG. 7, there is depicted a cross-sectional view of a laminated suspension having an enclosing member for protecting the conductive lines according to a preferred embodiment of the present invention. Base member 50 has insulating layer 52 and conductive lines 54 laminated to its top surface. Enclosing member 56 is attached to base member 50 on its top surface at each end, as seen in FIG. 7. Enclosing member 56 is formed from a thin sheet of stainless steel and is attached to base member 50 by spot welding or other mechanical means of attachment. Enclosing member 56 is bent on both sides to elevate the unattached portion of enclosing member 56 above the surface plane of base member 50. Enclosing member 56 is elevated out of contact with conductive lines 54 but extends out over conductive lines 54 to completely enclose conductive lines 54 along the length of the suspension.

The suspension's conductive lines 54 are protected from electrostatic discharge by the protective enclosing member 56 because it physically shields the conductive lines 54 from any object which may make contact with the suspension. Enclosing member 56 is essentially a "hat-like" member which runs along the length of the suspension that completely encloses the conductive lines 54, and therefore, provides a physical barrier to any potential tribo-charged object. In addition, enclosing member 56 also acts as a stiffening member to strengthen the suspension and reduced deformation of the load beam.

Referring now to FIG. 8, there is depicted an alternative preferred embodiment of the present invention. As shown in the cross-sectional view of FIG. 8, the suspension comprises base layer 60 having an insulating layer 62 formed thereon, conductive lines 64 formed upon insulating layer 62, and conformal insulating layer 66 which completely covers insulating layer 62 and conductive lines 64. Here conductive lines 64 are protected from electrostatic discharge by a tribo-charged object by insulating layer 66. This insulating layer 66 may be formed from any electrically insulating material. In the preferred embodiment of FIG. 8, this conformal layer is polyimide. As seen in the figure, conductive line 64 are protected from any charge transfer by the physical insulating layer 66.

Therefore, the present invention provides electrical protection to an integrated suspension by providing both physical barriers and suspension structures which substantially reduces or eliminates the possibility of electrostatic discharge to the suspension conductive lines through physical contact with another charged object. The various embodiments of this invention include a suspension structure having a flange member extending from its surface, a suspension structure wherein the electrical lead lines are recessed in a channel, a suspension where the electrical lead lines are covered by an enclosing metal member, and a suspension where the electrical lead lines are covered by a conformal insulating layer.

While the invention has been particularly shown and described with reference to a preferred embodiment, it will be understood by those skilled in the art that various changes in form and detail may be made therein without departing from the spirit and scope of the invention.

I claim:

1. A multilayered suspension suitable for use in an information processing system having electro-static discharge protection of conductor lines, comprising:

a base member that acts as a load beam to provide the suspension structural integrity and formed from one or more layers of the multilayered suspension and having a channel extending along substantially an entire length of the base member; and a conductive lead structure formed from one or more layers of the multilayered suspension over the base member and within the channel, the conductive lead structure having one or more conductor lines contained in a patterned conductive layer, and being suitable on a slider end for connection to transducer leads of a slider and on a termination end for connection to arm-electronics termination pads, wherein the one or more conductor lines are protected from contact with an object having static charge;

the multilayered suspension being formed by laminating a base layer over an insulating layer and laminating the insulating layer over a conductive layer, and wherein the channel is formed by two bend regions in the base member, one bend region on each side of the conductive lines, wherein each bend region extends along substantially the entire length of the base member and comprises a first bend of the base member in the direction of the conductive lines and a second bend in a direction away from the conductive lines such that ends of the base member are in a plane parallel to but elevated above the plane of the conductive lines.

2. A multilayered suspension according to claim 1, wherein the channel is formed by etching the base member.

3. A multilayered suspension suitable for use in an information processing system having electro-static discharge protection of conductor lines, comprising:

a base member that acts as a load beam to provide the suspension structural integrity and formed from one or more layers of the multilayered suspension and having a channel extending along substantially an entire length of the base member, wherein the channel is formed by two bend regions in the base member, one bend region on each side of the conductive lines, wherein each bend region extends along substantially the entire length of the base member and comprises a first bend of the base member in the direction of the conductive lines and a second bend in a direction away from the conductive lines such that ends of the base member are in a plane parallel to but elevated above the plane of the conductive lines; and a conductive lead structure formed from one or more layers of the multilayered suspension and formed within the channel and over the base member, the conductive lead structure having one or more conductor lines contained in a patterned conductive layer, and being suitable on a slider end for connection to transducer leads of a slider and on a termination end for connection to arm-electronics termination pads, wherein the one or more conductor lines are protected from contact with an object having static charge.

4. A multilayered suspension according to claim 3, wherein the channel is formed by etching the base member.

5. A suspension suitable for use as a slider suspension assembly for an information storage system comprising:

a base member that acts as a load beam to provide the suspension structural integrity and having a channel defined by two bend regions in the base member, wherein the base member has a middle portion and two end portions, and further wherein the end portions lay in a plane parallel to and spaced apart from the middle portion, each end portion being connected to the middle portion by one of said bend regions; and conductive lines integrally formed within the channel such that a bend region is located on each side of the conductive lines, and wherein the conductive lines are not covered by a solid insulating material, such that the end portions protect the conductive lines from coming into contact with an object that contains static charge, wherein each bend region of the base member comprises a first bend of the base member in an upward direction and a second bend of the base member in an outward direction such that the end portions of the base member are in a plane parallel to but elevated above the plane of the conductive lines, and wherein the conductive lines are protected from contact with an object having electrostatic charge.

* * * * *